Patented July 20, 1954

2,684,345

UNITED STATES PATENT OFFICE 2,684,345

INTERPOLYMERIZATION PRODUCTS OF POLYMERIC POLYHYDRIC ALCOHOL ESTERS WITH METHACRYLIC ACID ESTER MONOMERS

Henry Yuska, Richmond Hill, N. Y., and John E. Hanle, Westfield, N. J., assignors to Interchemical Corporation, New York, N. Y., a corporation of Ohio No Drawing. Application September 18, 1951, Serial No. 247,197

9 Claims. (Cl. 260—23)

This invention relates to new synthetic thermoplastic resins, and more particularly to new synthetic thermoplastic resins which are soluble in volatile organic solvents and comprise novel interpolymerization products of polymeric polyhydric alcohol esters with methacrylic acid ester monomers.

The new resins appear to be copolymers because they are made by interpolymerization of a lower alkyl ester of methacrylic acid, such as the methyl, ethyl, propyl, or butyl ester, with an ethylenically unsaturated polyester.

The unsaturated polyesters used in this invention are prepared, for instance, according to U. S. Patent No. 2,456,408. These polyester starting materials are higher fatty acid esters of polymeric polyhydric alcohols. The polymeric polyhydric alcohols have alternating aliphatic chains and aromatic nuclei united through ether oxygen and have the equivalent of from 5 to 20 hydroxyl groups per molecule. For the purposes of the present invention the polyester must contain unsaturated fatty oil acid; the molar ratio of such acid per molecule of polyester is preferably between 1 to 3.5 for fatty oil acids containing conjugated ethylenic bonds and 1 to 6.8 for acids containing non-conjugated ethylenic bonds. The polyester starting material may contain saturated fatty acid in addition to the unsaturated fatty oil acid, in which event the total amount of fatty acid present may of course exceed the upper limits given above. Polyesters of the commonly known unsaturated fatty oil acids are operable in the invention, e. g. esters of soya oil acids, linseed oil acids, and dehydrated castor oil acids. So far as is known any of the saturated higher fatty acids, can be used with the unsaturated higher fatty acids, to make the polyester starting material. The most readily available saturated fatty oil acids are coconut oil acids and for this reason these acids would be preferred if saturated fatty oil acids are used.

The polyesters preferred in the present invention are those prepared from polyhydric alcohols made from dihydroxy diphenyl dimethyl methane, especially 4,4'dihydroxy diphenyl dimethyl methane or commercial mixtures of this 4,4' isomer with lesser quantities of 2,2' isomer and the 4,2' isomer (i. e. "Bisphenol A"), and epichlorohydrin. The polymeric polyhydric alcohols, which comprise the alcohol component of the polyester starting material, are commercially available products, e. g. Epon. They are prepared in accordance with known prior art methods, for instance, by reacting bisphenol (pp'-dihydroxydiphenyl dimethyl methane) or other polyhydric phenols with polyhaloalcohols, epihalohydrins or polyepoxy compounds to give polymeric polyhydric alcohols containing the desired molecular weight and the desired number of alcoholic hydroxyl groups. For the purposes of the present invention, it is preferred that the polymeric polyhydric alcohol be prepared from bisphenol and that it has a molecular weight on the order of 800 to 4,000 and contain 5 to 20 hydroxyl groups (calculated from equivalent weight determinations) per molecule. The number of hydroxyl groups per molecule generally increases with the molecular weight of the polyhydric alcohol.

The upper limits of moles of unsaturated fatty oil acid per mole of the polyester that is operable in the invention is 3.5 or 6.8 depending upon whether the fatty acid contains conjugated unsaturation or not. Above these amounts of unsaturated fatty oil acids, the resulting polyester tends to give undesirable gels when the polyesters are copolymerized with methacrylate ester. The tendency to give undesirable gels increases with the molecular weight of the polyhydric alcohol. The lower limit of fatty oil acid in the polyester is not particularly critical, however, as a practical matter, it is preferred that there be at least about one mole of the unsaturated fatty oil acid per mole of ester.

It is very surprising that of all of the polymerization monomers that are very similar to methacrylic acid esters, e. g. acrylic acid esters, the present invention appears to be specific for interpolymerization of methacrylic acid esters. For instance, in attempts to prepare interpolymers from methyl acrylate and the polyesters heretofore described, undesirable gels resulted. Even with mixtures of methyl methacrylate and methyl acrylate, undesirable gels were obtained except when methyl methacrylate constituted at least about 90% of the monomer mixture. Therefore, the present invention is limited to interpolymers in which methacrylic acid esters constitute at least 90% of the monomer used.

The new resins of the present invention are preferably made by heating the methacrylic acid ester with the polyester in a mutual, non-reactive solvent, in the presence of conventional peroxide type catalysts. Conventional reaction temperatures, such as 75° to 150° C., are preferred and the reaction is continued until at least 90% of the monomer has polymerized.

In the accompanying examples, which illustrate the invention, the unsaturated polyester starting materials were all made by esterifying unsaturated fatty oil acids, or a mixture of unsaturated fatty oil acids and saturated acids, with polymeric polyhydric alcohols made in accordance with prior art procedures by condensing epichlorohydrin with "Bis Phenol A" (a mixture of isomers of dihydroxy-diphenyl-dimethyl methane, with the 4,4' isomers predominating and with lesser amounts of the 2,2' and 4,2' isomers being present). Preferably, the polyesters were made by direct esterification of the polyhydric alcohol with the fatty acids at temperatures on the order of 200 to 250° C. using an organic solvent, such as xylol or toluol as an azeotroping agent to remove the water formed during the course of the reaction. The esterification was continued until the acid number of the reaction mixture was about 5 or under.

The copolymerization of the polyesters with methyl methacrylate, in accordance with the invention, is preferably carried out in an organic solvent such as xylol, toluol, or a commercial solvent mixture such as Solvesso. All of the conventionally used peroxide type catalysts appear to be operable in the invention. The following examples illustrate the method of copolymerizing the polyester with the methyl methacrylate monomer.

*Example 1.*—The desired molar ratio of polyester and methyl methacrylate were dissolved in Solvesso 100 or xylol to give a 60% concentration of reactive ingredients. Peroxide catalyst, for instance benzoyl peroxide, was added to the solution to the extent of about 1% based on the weight of reactive ingredients. The solution was then heated to about 80° C. and maintained at this temperature until at least 90% of the monomeric methyl methacrylate had polymerized. If necessary a further addition of ½ to 1% of catalyst was added to attain the conversion of at least 90% of the monomer. The percent conversion was determined on the basis of the total non-volatile content of the reaction mixture.

*Example 2.*—Another typical procedure for effecting the interpolymerization consists in quickly heating the solution of monomeric methyl methacrylate and polyester, and added catalysts, e. g. t-butyl perbenzoate, to a temperature of 100–105° C., where an exothermic reaction generally begins and the temperature rises rapidly to 115–120° C., accompanied by vigorous refluxing. As the methyl methacrylate monomer is converted to resin, the temperature of the refluxing mixture gradually rises to about 135° C. After the reaction has continued for about 3 hours an additional ½ to 1% of catalyst may be added and the refluxing continued for another 3–4 hours at 125–140° C. to obtain at least 90% conversion of the methyl methacrylate to resin.

As stated heretofore the polyesters used as starting materials in the present invention are prepared by typical prior art procedure by direct esterification of the polyhydric alcohol with the fatty oil acids using a water-immiscible organic solvent, such as xylol or toluol as an azeotroping agent. In Example 3 are listed numerous polyesters prepared in this manner as possible starting materials in the present invention.

*Example 3.—Polyester starting materials* a. 1 mole of Epon 1001[1] with 2.14 moles of dehydrated castor oil acids.
b. 1 mole of Epon 1001 with 5 moles of dehydrated castor oil acids.
c. 1 mole of Epon 1001 with 2.2 moles of dehydrated castor oil acids.
d. 1 mole of Epon 1004[2] with 1.25 moles of dehydrated castor oil acids.
e. 1 mole of Epon 1004 with 3.3 moles of dehydrated castor oil acids.
f. 1 mole of Epon 1004 with 5.0 moles of dehydrated castor oil acids.
g. 1 mole of Epon 1004 with 7.5 moles of dehydrated castor oil acids.
h. 1 mole of Epon 1004 with 1 mole oleic acid.
i. 1 mole of Epon 1004 with 3.3 moles oleic acid.
j. 1 mole of Epon 1004 with 6.8 moles oleic acid.
k. 1 mole of Epon 1004 with 3.3 moles castor oil fatty acids.
l. 1 mole of Epon 1004 with 3.3 moles of stearic acid.
m. 1 mole of Epon 1004 with 3.3 moles lauric acid.
n. 1 mole of Epon 1004 with 3.3 moles of dehydrated castor oil acids.
o. 1 mole of Epon 1004 with 3.3 moles linseed acids.
p. 1 mole of Epon 1004 with 3.3 moles of soya acids.
q. 1 mole of Epon 1007[3] with 7.1 moles of dehydrated castor oil acids.
r. 1 mole of Epon 1007 with 6.3 moles of dehydrated castor oil acids.
s. 1 mole of Epon 1007 with 3.3 moles of dehydrated castor oil acids.
t. 1 mole of Epon 1009[4] with 8.9 moles of dehydrated castor oil acids.
u. 1 mole of Epon 1009[4] with 3.3 moles of dehydrated castor oil acids.

*Example 4.—Interpolymers of methyl methacrylate with the polyesters of Example 3.*—Attempts were made to prepare soluble interpolymerization products from each of the polyesters of Example 3 using 50:50 mixtures of the polyesters with methyl methacrylate. Polyesters a, c, d, e, h, i, j, k, n, o, p, s and u all gave useful soluble products. Polyesters f and g, which contain 5 and 7.5 moles respectively, of dehydrated castor oil fatty acids per mole of ester, gave undesirable gels. Similarly, polyesters b, q, r and t resulted in gelation. Polyesters l and m showed no evidence of interpolymerization; in these experiments the methyl methacrylate appeared to polymerize alone and separate as polymethylmethacrylate.

*Example 5.—Effect of amount of monomer on the interpolymerization.*—A series of experiments were carried out to determine what effect the ratio of methyl methacrylate to polyhydric ---
[1] Epon 1001 is a polyhydric alcohol formed from bisphenol and epichlorohydrin having a molecular weight of 900 and contains approximately 7 hydroxyl groups per molecule based on equivalent weight determinations.
[2] Epon 1004 is similar to Epon 1001 except it has a molecular weight of 1400 and contains approximately 8 hydroxyl groups.
[3] Epon 1007 is similar to Epon 1001 except it has a molecular weight of 3000 and contains approximately 16 hydroxyl groups.
[4] Epon 1009 is similar to Epon 1001 except that it has a molecular weight of 3750 and contains approximately 19 hydroxyl groups.

alcohol ester would have on the interpolymerization reaction.

I. 1 mole of Epon 1004 was esterified with 3.33 moles of dehydrated castor oil fatty acids and then the polyester was interpolymerized with methyl methacrylate in the following ratios:

*a.* 85 parts of polyester with 15 parts of methyl methacrylate.

*b.* 65 parts of the polyester with 35 parts of methyl methacrylate.

*c.* 50 parts of the polyester with 50 parts of methyl methacrylate.

*d.* 30 parts of the polyester with 70 parts of methyl methacrylate.

II. 1 mole of Epon 1004 was esterified with 5 moles of dehydrated castor oil fatty acids and then the polyester was interpolymerized.

*a.* 50 parts of polyester with 50 parts of methyl methacrylate.

*b.* 65 parts of polyester with 35 parts of methyl methacrylate.

In the above experiments all of the interpolymerizations in which the polyester contained 3.3 moles of dehydrated castor oil fatty acid per mole of polyester gave soluble products with all ratios of methyl methacrylate. In experiments II-*a*, and II-*b*, where the molar ratio of dehydrated castor oil acid to polyester is 5 to 1 the products tended to gel.

*Example 6.—Effect of type of monomer on the interpolymerization.—*Using the polyester obtained from 60 parts of Epon 1004 and 40 parts of dehydrated castor oil, the following interpolymerizations were carried out:

*a.* 50 parts of polyester with 50 parts of acrylonitrile.

*b.* 85 parts of polyester with 15 parts of acrylonitrile.

*c.* 50 parts of polyester with 50 parts of methyl acrylate.

*d.* 66 parts of polyester with 33 parts of methyl acrylate.

*e.* 50 parts of polyester with 50 parts of vinyl acetate.

*f.* 53.7 parts of polyester with 46.3 parts of methyl acrylate.

*g.* 20 parts polyester with 80 parts of methyl acrylate.

*h.* 50 parts of polyester with 10 parts methyl acrylate and 40 parts methyl methacrylate.

*i.* 50 parts of polyester with 50 parts butyl acrylate.

*j.* 50 parts of polyester with 50 parts butyl methacrylate.

In the above experiments all of the interpolymerization gave undesirable gelation with the exception of *h* and *j*. Also, in a further experiment in which 50 parts of butyl methacrylate was interpolymerized with 50 parts of a polyester containing 3.33 moles of soya oil fatty acids per mole of Epon 1004, a soluble, useful product was obtained.

The new resins prepared in accordance with the present invention are useful in lacquers, varnishes, paints, inks, etc., where film-forming resins are conventionally used. They are readily soluble in most commercial solvents that are used in paints, varnishes, except pure aliphatic hydrocarbons and, compared with the resinous or polymeric polyhydric alcohol esters from which they are prepared, they appear to be more compatible with varnish lacquer and ink vehicles. Further, films formed from these new interpolymer resins show little discoloration or ageing and heating and are harder than films prepared from the resinous polyesters from which they are derived. Also, the new resins made in accordance with the invention dry to non-tacky films in shorter time and at lower temperature than the polyesters from which they are prepared.

The molecular weights of the polymeric polyhydric alcohols listed in Example 3 are average molecular weights as given by the supplier. The number of hydroxyl groups for each of the polyhydric alcohols was calculated by dividing the average molecular weights of polyhydric alcohol by the equivalent weights.

We claim:

1. Thermoplastic resins which are interpolymerization products of (1) an ester of methacrylic acid with a monohydric alcohol containing 1 to 4 carbon atoms and (2) a polyester obtained by esterifying (*a*) a polymeric polyhydric alcohol having alternating aliphatic chains and aromatic nuclei united through ether oxygen and containing from 5 to 20 alcoholic hydroxyl groups per molecule with (*b*) ethylenically unsaturated fatty acids, the ratio of moles of unsaturated fatty acid to moles of polymeric polyhydric alcohol being between 1 to 1 and 3.5 to 1 for fatty acids containing conjugated ethylenic double bonds, and up to between 1 to 1 and 6.8 to 1 for fatty acids containing non-conjugated double bonds.

2. Thermoplastic resins which are interpolymerization products of (1) methyl methacrylate and (2) a polyester obtained by esterifying (*a*) a polymeric polyhydric alcohol having alternating aliphatic chains and aromatic nuclei united through ether oxygen and containing from 5 to 20 alcoholic hydroxyl groups per molecule with (*b*) ethylenically unsaturated fatty acids, the ratio of moles of unsaturated fatty acid to moles of polymeric polyhydric alcohol being between 1 to 1 and 3.5 to 1 for fatty acids containing conjugated ethylenic double bonds, and up to between 1 to 1 and 6.8 to 1 for fatty acids containing non-conjugated double bonds.

3. Thermoplastic resins as claimed in claim 2 in which the ethylenically unsaturated fatty acid is dehydrated castor oil fatty acid.

4. Thermoplastic resins as claimed in claim 2 in which the ethylenically unsaturated fatty acid is linseed oil fatty acid.

5. Thermoplastic resins as claimed in claim 2 in which the polymeric polyhydric alcohol contains 8-hydroxyl groups and has a molecular weight of 1400.

6. Thermoplastic resins which are interpolymerization products of (1) an ester of methacrylic acid with a monohydric alcohol containing 1 to 4 carbon atoms and (2) a polyester hydric alcohol prepared by condensing dihydroxy-diphenyl-dimethyl methane with epichlorohydrin with (*b*) ethylenically unsaturated fatty oil acids, the ratio of moles of unsaturated fatty acid to moles of polymeric polyhydric alcohol being between 1 to 1 and 3.5 to 1 for fatty acids containing conjugated ethylenic double bonds, and up to between 1 to 1 and 6.8 to 1 for fatty acids containing non-conjugated double bonds.

7. Thermoplastic resins which are interpolymerization products of (1) methyl methacrylate and (2) a polyester obtained by esterifying (*a*) a polymeric polyhydric alcohol prepared by condensing dihydroxy-diphenyl-dimethyl methane with epichlorohydrin with (*b*) ethylenically unsaturated fatty oil acids, the ratio of moles of unsaturated fatty acid to moles of polymeric polyhydric alcohol being between 1 to 1 and 3.5 to 1 for fatty acids containing conjugated ethylenic double bonds, and up to between 1 to 1 and 6.8 to 1 for fatty acids containing non-conjugated double bonds.

8. Thermoplastic resins as claimed in claim 7 in which the unsaturated fatty oil acid is dehydrated castor oil fatty acids.

9. Thermoplastic resin as claimed in claim 7 in which the polymeric polyhydric alcohol has a molecular weight of from 900 to 3750.

References Cited in the file of this patent

UNITED STATES PATENTS

| Number | Name | Date |
|---|---|---|
| 2,596,737 | Tess et al. | May 13, 1952 |